United States Patent

Vance

[15] 3,696,401

[45] Oct. 3, 1972

[54] DIGITAL DATA DECODER WITH DATA RATE RECOVERY

[72] Inventor: James T. Vance, Hawthorne, Calif.

[73] Assignee: General Instrument Corporation, Hawthorne, Calif.

[22] Filed: Oct. 9, 1970

[21] Appl. No.: 79,558

[52] U.S. Cl. .......................340/347 DD, 340/174.1 G

[51] Int. Cl. ................................................H04l 3/00

[58] Field of Search ..340/347 DD, 174.1 G, 174.1 H

[56] References Cited

UNITED STATES PATENTS

| | | | |
|---|---|---|---|
| 3,537,082 | 10/1970 | Vallee | 340/347 DD |
| 3,448,445 | 6/1969 | Vallee | 340/347 DD |
| 3,564,557 | 2/1971 | Ruthazer | 340/347 DD |

*Primary Examiner*—Maynard R. Wilbur
*Assistant Examiner*—Jeremiah Glassman
*Attorney*—Smyth, Roston & Pavitt

[57] ABSTRACT

A decoder circuit is disclosed for decoding digital signals having frame end transitions, for example, on bits of value "1" and mid-frame transitions for the second one of two sequential "0's" and for each "0" thereafter. Sequential transitions alternatingly trigger two oscillators of similar frequency which is at least twice the bit rate frequency. The oscillations overlap to ensure phase coherency. The oscillator outputs are combined and counted down to the bit rate frequency for bit rate recovery. The frame ends are strobed to detect absence or presence of a transition for bit value recovery.

6 Claims, 3 Drawing Figures

INVENTOR:
James T. Vance

By Smyth, Roston & Pavitt
ATTORNEYS

INVENTOR.
James T. Vance
By Smyth, Roston & Pavitt
ATTORNEYS

DIGITAL DATA DECODER WITH DATA RATE RECOVERY

The present invention relates to a decoding circuit, for decoding signals representing digital data, wherein the delay between sequential recurrence of a particular characteristic portion of the signal is of digital significance. Particularly, the invention relates to the decoding of playback signals derived, for example, from a magnetic storage carrier wherein the spacing of flux reversals on the carrier is represented as delay between transitions in the signal. It is assumed that the digital signals are represented in bivalued bits, whereby sequential bits are presented by and in sequential bit frames. A bit frame is a particular recording space and represented by a particular period of time during playback in which bit value representation must occur.

The invention finds particular utility in the recovery of bivalued digital data, wherein a first bit value is represented by a signal transition (corresponding, for example, to a flux reversal) on a bit frame boundary, while absence of such a signal transition on a bit frame boundary represents a bit of opposite value. Bit frame boundary may be particularized as the trailing end boundary of a bit frame. In order to permit self clocking and immediate bit rate recovery, there should be at least one transition per two bit frame periods. The signal may contain mid-frame or center transitions for bits of the second value, if the preceding bit had the same value. The format of such encoding is disclosed in U.S. Pat. Nos. 3,108,261 and 2,807,004.

The aforementioned encoding format has the advantage of self clocking over NRZ and NRZ1 codes even though there are less than one transition per bit frame. On the other hand, the density of flux transitions is smaller than in case of conventional frequency doubling and Manchester codes, so that the data density in the space-time spectrum of recording and reproducing can be increased for comparable read signal strength and S/N ratios. On the other hand, the metering of delays between transitions becomes somewhat more critical, because regular delays between signal transitions include one, one and a half or even two bit frame periods. This, in turn, renders the problem of bit crowding more complex, particularly in case there are data rate variations (for example, due to playback speed variations). The invention now deals with the decoding problem in a manner that is highly advantageous for recovery of bit rate and bit values from signals in which the timing in between sequential particular characteristics, such as signal transitions, or signal excursions representing, for example, flux transitions, is critical and of digital significance.

In accordance with the preferred embodiment of the invention, it is suggested to provide a pair of oscillators of similar frequency, higher than the bit rate frequency. These oscillators are alternatingly stimulated, namely in response to alternatingly occurring transitions. The stimulation, in particular, causes the respective oscillator to start at a particular phase, and the particular oscillator stops upon commencement of the other one, with a slight overlap in operation. The phase of starting of the two oscillators in response to sequential transitions is defined by the relationship between oscillator period and half frame bit period, so that in case of correct timing between the transitions, one oscillator has precisely that phase with which the other one starts. This requires the oscillator's period to be an even numbered multiple of the bit frame period to achieve phase coherency.

The oscillator outputs are combined to form a clock pulse train having frequency that is at least twice the bit rate frequency, but whose phase is reset on each signal transition. The overlap of oscillator operation prevents production of a spurious clock pulse during the changeover. By means of counting the clock pulses on a cyclic basis, the bit rate is reconstituted, and strobing phases are established to detect, for example, whether or not a transition occurs on a frame boundary as timed by the recorded bit rate.

The aforementioned overlap ensures particularly phase coherency between the combined oscillations and counting. In order to synchronize the operation ab initio, the data stream has to include a three bit preamble of alternating bit values and in such combination, for example, that a mid-frame transition is not included. That portion of the preamble is detected by requiring that a number of clock pulses be counted uninterruptedly as equivalent of two bit frames. This way the data rate recovery can synchronize with the frame boundaries.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Figures 1, 3:
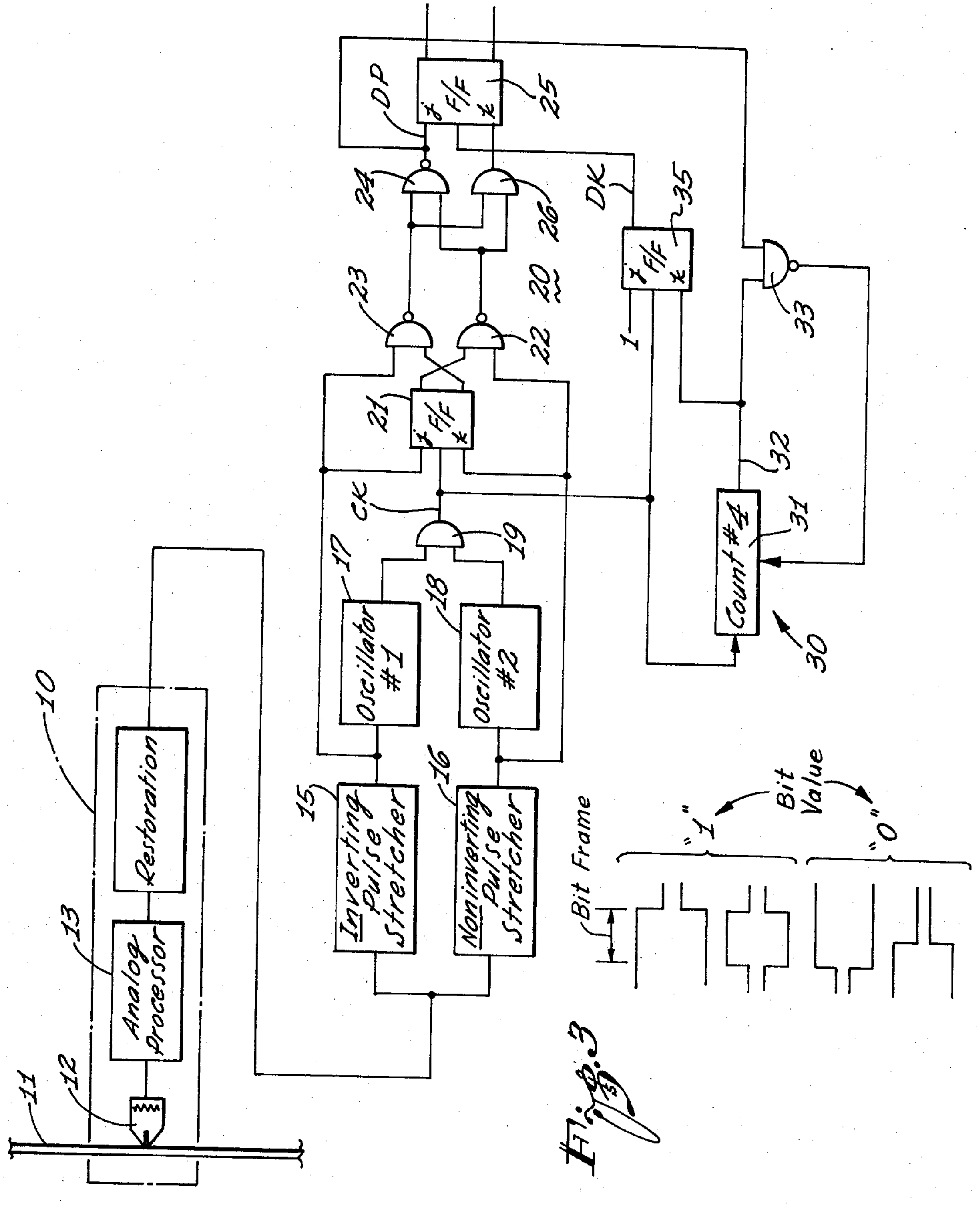
FIG. 1 illustrates a block diagram of a data decoder in accordance with the preferred embodiment of the invention.
FIG. 3 is a schematic representation of the code pattern that is decoded in the circuit of FIG. 1.

Proceeding now to the detailed description of the drawing, in FIG. 1 thereof, there is illustrated a source of data 10, which may, for example, be comprised of a movable, magnetic storage carrier 11 such as a disk, a drum or a tape and coacting for read-out with a transducer 12. The read-out signals are analog processed in a stage 13 and fed to a circuit 14 which provides a signal train that in the essence represents and reconstitutes a representation of the flux pattern on the storage carrier. The first line in FIG. 2 depicts a representative example of an output of source 10.

Figure 2:
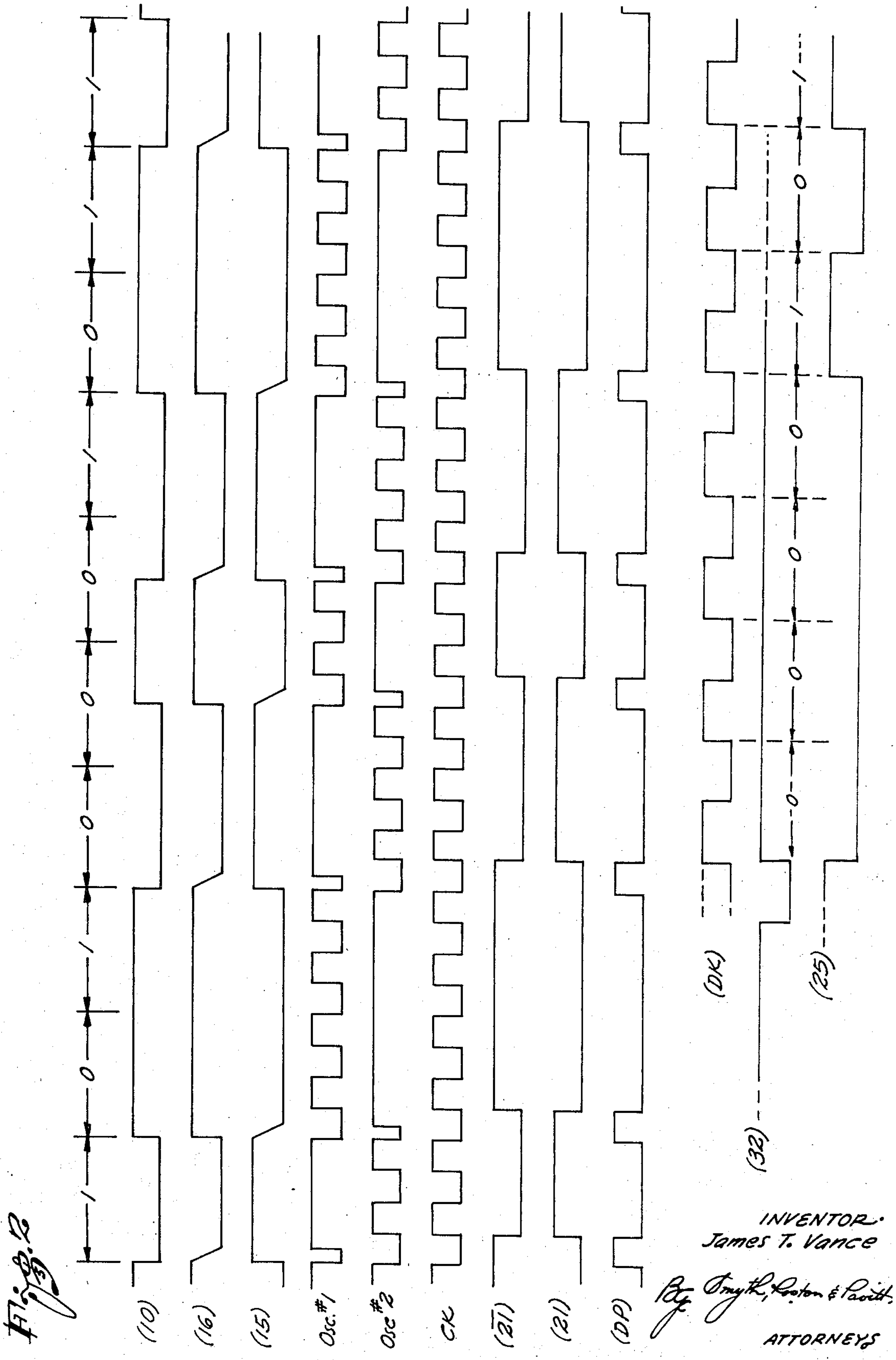
FIG. 2 illustrates a timing diagram of significant signals developed by and in the circuit of FIG. 1.

The bit values of digital data that have been recorded are written above the flux reproducing signal train 10 in FIG. 2. Each double arrow represents a bit frame. The encoding pattern employed is shown in FIG. 3. For a bit of value "1," a flux reversal or transition has been recorded on the trailing end boundary of a bit frame. If the preceding bit had also value "1," a transition will appear on the trailing end of that preceding bit frame.

For a bit of value "0" a flux reversal or transition is not recorded on the trailing end of the respective bit frame. A transition may appear on the leading edge of that bit frame if the preceding bit had value "1" as that boundary was the trailing end of that preceding bit frame. A transition is recorded in the center of a bit frame if the preceding bit was also a zero.

It can thus be seen that, on the average, there are less transitions than data bits, but there is at least one transition per two data bits. The data detection process, thus, must be able to distinguish among these various cases; a detected transition may succeed a previous one at full bit frame delay, one and half bit frames or two bit frames. Data decoding requires two related operations. First, the bit rate must be recovered; second, the bit values must be detected and decoded. The process described next involves bit value detection in relation to detected bit rate.

The output signal of source 10 is fed to two pulse stretchers 15 and 16, the first one thereof being an inverter, and both extending the trailing edge of their respective outputs in response to the input as derived from source 10. The lines marked (15) and (16) in FIG. 2 depict the corresponding signals. It may be assumed that each of the complementary outputs vary between ground potential and a positive operating potential. The signal extension covers a period that will be defined shortly.

The positive output signals of the two circuits 15 and 16, when provided, respectively enable oscillators 17 and 18, also designated oscillator No. 1 and oscillator No. 2. These oscillators can be thought of as a-stable or free running multivibrators, which are clamped to a particular state if the respective enabling input signal has ground potential. In that state, for example, the particular multivibrators provide a steady positive output, corresponding to persistence of particular states of conduction of the respective active elements in each multivibrator.

The leading edge of the positive going enabling signal when applied to the respective oscillator serves as trigger signal to shift the multivibrator into the opposite state, whereupon its output drops to ground potential (see curved arrows in FIG. 2). The subsequent (but temporary) persistence of the enabling signal renders the respective oscillator astable to oscillate at a particular frequency. The two oscillators have similar frequencies, and due to temporary extension of the enabling signals respectively provided by the two pulse stretchers 15 and 16, there is a brief period of overlap of oscillator operation. That overlap should be less than half of an oscillator period, so that an oscillator terminates clearly during a half wave of the other one that just started, to prevent concurrence of oppositely directed pulse edges.

It can thus be seen that in response to each detected, data defining transition in one direction, one of the oscillators starts to run at a predetermined phase. The oscillations persist until shortly after occurrence of an oppositely directed data defining transition. At that transition, and upon each similarly directed transition, the other oscillator begins to run, etc.

The outputs of the oscillators 1 and 2 are combined as a logical product in an AND gate 19, and the resulting clock pulse train is depicted under that designation in FIG. 2. The signals are shown in an idealized shape, but they do have, of course, finite raise and fall times. Combining of and concurring with falling edges could produce a "glitch" that could destroy synchronism of operation. The particular overlap of oscillator operation avoids that type of error.

The characteristic function of the local clock is as follows. It has a frequency above the data and data frame rate; it is a free running, local clock that has its phase reset or adjusted to the data rate by ensuring that, for example, a "falling clock" edge always occurs or is produced at each detected transition. The clock is the combined unambiguous output of two overlapping operating oscillators.

The system may well accommodate significant variations in the data rate without losing synchronism. For example, in the illustrated embodiment two oscillation periods correspond to a data frame period at normal data rate. Thus, normally a falling clock edge occurs on each frame boundary as well as in the center of each frame period. However, the number of two clock pulses per frame period will not be disturbed even if the bit rate varies by about ± 12 percent. The pulse stretching operation ensures that in the transition from one oscillator operation to the other, there will be no indefiniteness, so that, for example, an "extra" clock pulse is not provided, as long as data rate variations stay within the ± 12 percent limit.

The signals as developed, thus far, are used in two circuits. A first circuit 20 is provided to recover the digital significance that is included in phase and spacing of sequential transitions of the data train 14. A second circuit 30 is provided to recover the bit rate and to establish synchronism of operation with frame boundary transitions.

The circuit 20 includes a delaying *jk* flip-flop 21 which, in combination with a pair of NAND gates 22 and 23, provides for particular signal representation of the transitions. The clock pulse train CK operates as clock for the flip-flop. The output of inverting pulse stretcher 15 is the *j*-input for the flip-flop, the output of non-inverting pulse stretcher provides the K-input thereof. The flip-flop, furthermore, is presumed to operate on rising clock. Alternatively, gate 19 could be a NAND gate to operate the flip-flop 21 on falling clock.

Lines marked (21) and $\overline{(21)}$ in FIG. 2 depict the resulting state signals of the flip-flop which is a replica of the outputs (15) and (16), but at a phase shift of half a clock pulse period. It should be noted, that a JK flip-flop changes state when both inputs are true; thus the overlap of the input signals for the flip-flop due to signal stretching has no significance.

The NAND gate 22 combines the set-side output of flip-flop 21 with the output of inverting circuit 16 and produces a signal train, that is false only for half a clock pulse period succeeding a leading (positive swing) transition of the data signal from source 10. The NAND gate 23 combines the reset output of flip-flop 21 with the output of inverting circuit 15 and produces a signal train that is composed of false signals having duration of half a clock pulse period succeeding the negative going, trailing edges of the data signal from source 10.

A NAND gate 24 combines the outputs of NAND gates 22 and 23 and produces a data pulse train DP depicted in the correspondingly marked line in FIG. 2, there being a positive going data pulse of half clock pulse period succeeding each data defining transition, independent from direction. In order to extract the digital information from the spacing of the data pulses produced by NAND gate 24, it is necessary to recover the bit rate; particularly the phase of the bit frame boundaries have to be tracked. The bit frame tracking and frame rate recovery requires a counting process conducted in circuit 30. As the clock rate is chosen to be twice the data rate, a single flip-flop 35 suffices to count the clock rate down by a division by two. Flip-flop 35 is normally operated as toggle flip-flop, having true inputs applied to its *jk* terminals and receiving the pulses *ck* as clock. Counting flip-flop 35 changes state on rising clock. This includes particularly each rising clock (*ck*) phase following precisely half a data pulse period after an oscillator was started anew on a data signal transition, be it a boundary transition or a mid-frame transition. The output of flip-flop 35 constitutes the recovered data clock *dk*, which, however, has its leading and trailing edges synchronized independently to the several data transitions. On the other hand, each leading data clock pulse *dk* follows half a clock pulse (*ck*) period after a bit frame boundary. It does so precisely, if there was a data transition on that boundary, it does so with sufficient approximation if there was no transition, provided the data rate variations stay within the rather wide limits of ± 12 percent.

The operation of flip-flop 35 as described presumes that synchronism with data frame boundaries has been established initially. This is carried out in fact as follows. The synchronizing process takes into consideration that, in case two transitions are apart by 2 bit frame periods, they must be on frame boundaries. It is impossible to devise a bit sequence in accordance with the code pattern (FIG. 3) that could result in two mid-frame transitions that are apart by 2 bit frame periods. Thus, circuit 30 is provided to detect occurrence of two transitions which are 2 bit frame periods apart and data clock flip-flop 35 is then synchronized to the second one of these two transitions. It can thus be seen that the recording, i.e., the data train generally, must be preceded by a preamble that includes the bit pattern 101 as only within that pattern there will occur with certainty a two frame delay between two transitions.

The circuit 30 includes a counter 31 counting clock pulses ck and particularly attempting to count four clock pulses. As long as counter output line 32 stays true, four clock pulses have not been counted. A data pulse from NAND gate 24 is applied to a NAND gate 33 which provides a negative going counter reset pulse as long as counter 31 has not reached count state No. 3 (the states are 0, 1, 2, 3, → 0). As counter 31 reaches count state No. 3 without having been reset, a 2 frame period has, in fact, elapsed on the next data pulse dp.

The output signal of the counter 31 is depicted in line (32) of FIG. 2. That signal is used as reset input for data clock flip-flop 35. It can be seen that normally, when counter 31 is in count state 0, 1 or 2, the true signal in line 32 in conjunction with a permanent true signal at the *j*-input of flip-flop 35 operates that flip-flop as toggle flip-flop. Now, as counter 31 reaches and is in count state No. 3, a false signal is applied to the K-input of flip-flop 35 for a full period of clock CK. Accordingly, flip-flop 35 will positively set on the rising edge of the next clock pulse CK that must be preceded by a data pulse DP, as long as the system operates within the said constraint of a ± 12 percent data rate deviation. That data pulse DP, in turn, marks the boundary transition at the end of a 2 frame period, which, by necessity, synchronizes the data clock flip-flop 35 with the boundaries.

It could be that flip-flop 35 is already in the set state as it synchronized previously to the wrong phase, but this does not change the result, as it will positively reset at the next clock pulse thereafter. Decisive is that upon occurrence of a data pulse during count state No. 3, flip-flop 35 will stay set for one clock pulse (CK) period, and further operation follows phase coherently therewith. Subsequently, the 101 bit pattern may recur, which merely resynchronizes operation.

In accordance with the encoding rule given above, a transition on a frame boundary always represents a "1" as content of the preceding bit frame. Absence of a transition represents a "0. " For data strobing it will be observed that the leading edge of a data pulse DP on a boundary concurs with the center of the reset state period of data clock flip-flop 35, while the leading edge of a data pulse DP representing a mid-frame transition concurs with about the center of a set state period of data clock flip-flop 35. Or, to state it differently, a leading edge of a set state signal of flip-flop 35, when concurring with the necessarily phase coherent trailing edge of a data pulse DP is a trigger signal for manifesting a "0," a leading edge of a set state signal of flip-flop 35 with no preceding data pulse DP is a trigger signal for manifesting a "1."

For this, a data flip-flop 25 is provided receiving the output of data clock flip-flop 35 as clock, to change state on the trailing edge of the set state output of the flip-flop 35. The output of NAND gate 24 serves as *j*-input for the data flip-flop 25. The inverted output derived, for example, from gates 22 and 23 through an AND gate 27 provides the K-input for flip-flop 26.

The invention is not limited to the embodiments described above but all changes and modifications thereof not constituting departures from the spirit and scope of the invention are intended to be included.

I claim:

1. A decoder circuit receiving signal representing digital data, wherein the delay between sequential, alternatingly directed transitions in the signal is of digital significance, the data represented in and by the signal having a particular rate, comprising:

first and second oscillator means for individually providing oscillations at similar particular frequency when enabled, the frequency being an integral multiple of the data bit rate, so that transitions occurring pursuant to a regular data bit rate coincide with the same phase in either oscillator when oscillating;

third means connected to receive the data representing signal, and connected to the first and second oscillator means respectively to start the first oscillator means in response to transitions in the first direction and at a particular phase of the oscillations, and to start the second oscillator means in response to transitions in the second direction and at the same particular phase, the first and second means after a transition in the second and first directions;

fourth means connected to the first and second oscillator means to obtain a combined output as clock pulse train; and fifth means connected to the fourth means to obtain a counting operation of the clock pulses in phase synchronism with the transitions, including sixth means providing a signal train that is representative of the bit rate, and including seventh means responsive to the counting operation to detect relative occurrence and non-occurrence of the transitions in relation to the progressing phase of bit presentation at said bit rate by said digital signal irrespective of direction of the transitions.

2. In a decoder circuit as in claim 1, the third means including means (a) providing an enabling signal to the first means from each transition in the first direction up to a small delay after the respective next transition in the second direction; and including means (b), providing an enabling signal to the second means from each transition in the second direction to a small delay after the respective next transition in the first direction.

3. In a decoder circuit as in claim 1, wherein transitions in either direction occur on bit frame boundaries in representation of bits of a first value, and wherein transitions in either direction occur in center frame positions for each second sequential bit of a second value and for each bit of second value immediately thereafter, the oscillations having frequency that is an even numbered multiple of the bit rate frequency.

4. A decoder circuit receiving signal representing digital data wherein a particular characteristic may occur on bit frame boundaries of the data and in the center of a frame, whereby the delay between sequential ones of the particular characteristics is of digital significance, the combination comprising:

first means for providing oscillations at a particular frequency that is an even numbered multiple of the bit frame rate;

second means connected to receive the data representing signal, being responsive to the particular characteristic and connected to the first means to establish a particular phase of the oscillations with each occurrence of that particular characteristic;

third means connected to the first means for obtaining a counting operation of the oscillations on a cyclic repetitive basis as to each bit frame boundary irrespective of occurrence of particular characteristic;

fourth means connected to the first and third means for detecting occurrence and non-occurrence of the particular characteristic on bit frame boundaries and providing signal representation of the corresponding digital significance thereof; and counter means connected to the first means and to the second means to be responsive to a delay counting of oscillations in between occurrence of two sequential particular characteristics which delay is representative of occurrence of at least a particular one of the two occurrences on a bit frame boundary, and connected to the third means to obtain synchronization of the counting operation by the third means.

5. A decoder circuit receiving signal representing digital data wherein a particular characteristic may occur on bit frame boundaries of the data and in the center of a frame, whereby the delay between sequential ones of the particular characteristics is of digital significance, the combination comprising:

first and second oscillators connected to receive the data representing signals and being alternatingly stimulated in response to occurrence of a particular characteristic up to the respective next one, each oscillator having similar frequency that is an even numbered multiple of the bit frame rate and commencing at a precise phase;

combining means connected to the oscillators to provide a common clock pulse train with corrected phase on each recurring particular characteristic;

first means connected to the combining means for obtaining a counting operation of the oscillations on a cyclic repetitive basis as to each bit frame boundary irrespective of occurrence of particular characteristic; and second means connected to the first means and to the first and second oscillators for detecting occurrence and non-occurrence of the particular characteristic on bit frame boundaries and providing signal representation of the corresponding digital significance thereof.

6. In a decoder as in claim 5, each oscillator remaining stimulated a short period beyond stimulation of the respective other one to establish similar overlapping oscillation phases.

* * * * *